US012646480B2

(12) United States Patent
Kim et al.

(10) Patent No.: US 12,646,480 B2
(45) Date of Patent: Jun. 2, 2026

(54) DISPLAY DEVICE WITH DRIVING CIRCUIT CAPABLE OF IMPROVING PRODUCT YIELD BY PREVENTING OCCURRENCE OF DEFECTS DUE TO STATIC ELECTRICITY

(71) Applicant: LG Display Co., Ltd., Seoul (KR)

(72) Inventors: SangKwon Kim, Paju-si (KR); Kyoung-Wook Kim, Paju-si (KR); Junha Lee, Paju-si (KR); Honggwon Lee, Paju-si (KR); Hyunjung Woo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/962,782

(22) Filed: Nov. 27, 2024

(65) Prior Publication Data

US 2025/0273180 A1 Aug. 28, 2025

(30) Foreign Application Priority Data

Feb. 26, 2024 (KR) ........................ 10-2024-0027392

(51) Int. Cl.
*G09G 3/36* (2006.01)

(52) U.S. Cl.
CPC ..... *G09G 3/3677* (2013.01); *G09G 2330/021* (2013.01); *G09G 2330/06* (2013.01)

(58) Field of Classification Search
CPC ...... G09G 3/36; G09G 3/3611; G09G 3/3614; G09G 3/3622; G09G 3/3625;
(Continued)

(56) References Cited

U.S. PATENT DOCUMENTS 8,860,706 B2 10/2014 Sakamoto et al.
9,905,188 B2 2/2018 Park et al.
(Continued)

FOREIGN PATENT DOCUMENTS

KR 10-1409110 B1 6/2014
KR 10-2018-0029721 A 3/2018
KR 10-2020-0005223 A 1/2020

OTHER PUBLICATIONS

Intellectual Property Office of the United Kingdom, Combined Search and Examination Report, United Kingdom Patent Application No. GB2417592.9, May 27, 2025, six pages.
(Continued)

*Primary Examiner* — Ke Xiao
*Assistant Examiner* — Nelson Lam
(74) *Attorney, Agent, or Firm* — Fenwick & West LLP

(57) ABSTRACT

A display device comprises: a display panel including a display area and a bezel area around the display area; a gate driving circuit driving a plurality of gate lines in the display area; an output line extending from the gate driving circuit; a jumping part in the bezel area and connecting the output line with a gate line of the plurality of gate lines; an output transistor in the gate driving circuit and connected to the output line; an output capacitor in the gate driving circuit between the output transistor and the jumping part, the output capacitor including a first electrode connected to a gate electrode of the output transistor and a second electrode partially overlapping the first electrode and the second electrode connected to a drain electrode of the output transistor and the output line, the first electrode including an extension region non-overlapping with the second electrode.

19 Claims, 7 Drawing Sheets

(58) Field of Classification Search
CPC .... G09G 3/3633; G09G 3/364; G09G 3/3644; G09G 3/3659; G09G 3/3666; G09G 3/3674; G09G 3/3677; G09G 3/3681; G09G 3/3685; G09G 3/3688; G09G 3/3692
USPC .................................................... 345/87–104
See application file for complete search history.

(56) References Cited

U.S. PATENT DOCUMENTS

| | | | | |
|---|---|---|---|---|
| 10,134,777 | B2 | 11/2018 | Park | |
| 2010/0097368 | A1 * | 4/2010 | Hwang | H04N 5/66 345/213 |
| 2010/0134396 | A1 * | 6/2010 | Umezaki | G02F 1/13624 349/48 |
| 2010/0265168 | A1 * | 10/2010 | Neugebauer | G09G 3/3614 345/87 |
| 2010/0277206 | A1 * | 11/2010 | Lee | G11C 19/184 327/108 |
| 2012/0327057 | A1 | 12/2012 | Sakamoto et al. | |
| 2013/0009931 | A1 * | 1/2013 | Yeo | G09G 3/344 345/107 |
| 2018/0076233 | A1 | 3/2018 | Park | |
| 2018/0174503 | A1 * | 6/2018 | Shim | G11C 19/184 |
| 2019/0156732 | A1 * | 5/2019 | Kong | G09G 3/3266 |
| 2020/0243569 | A1 * | 7/2020 | Umezaki | H10D 86/481 |
| 2023/0071094 | A1 | 3/2023 | Son et al. | |
| 2023/0162697 | A1 * | 5/2023 | Umezaki | G09G 3/20 377/64 |
| 2024/0161669 | A1 * | 5/2024 | Lu | G09G 3/3266 |

OTHER PUBLICATIONS

German Patent and Trademark Office, Office Action, German Patent Application No. 102024138540.5, Sep. 10, 2025, seven pages.

* cited by examiner

DISPLAY DEVICE WITH DRIVING CIRCUIT CAPABLE OF IMPROVING PRODUCT YIELD BY PREVENTING OCCURRENCE OF DEFECTS DUE TO STATIC ELECTRICITY

CROSS-REFERENCE TO RELATED APPLICATION

This application claims the priority from Republic of Korea Patent Application No. 10-2024-0027392, filed on Feb. 26, 2024, which is hereby incorporated by reference in its entirety.

BACKGROUND

Technical Field

The present disclosure relates to a display device having a driving circuit capable of preventing the occurrence of a defect due to static electricity.

Description of Related Art

The display device includes a display panel for displaying an image through a pixel matrix in which each subpixel is independently driven by a thin film transistor, and a gate driving circuit and a data driving circuit for driving the display panel.

The gate driving circuit is formed together with the thin film transistor and is embedded in the bezel area of the display panel. Display devices are developing in a direction in which the bezel width is further reduced even in the narrow bezel according to user demand.

Meanwhile, by reducing the bezel width, the gap between electrode patterns in the gate driving circuit is reduced, and thus defects may occur due to damage caused by static electricity, resulting in a decrease in product yield.

SUMMARY

The present disclosure provides a display device having a driving circuit capable improving product yield by preventing the occurrence of a defect due to static electricity.

The problems to be solved by embodiments of the present disclosure are not limited to those mentioned above, and other problems not mentioned above will be apparent to those skilled in the art to which the technical ideas of the present disclosure belong from the following descriptions.

To achieve these and other advantages and in accordance with the purpose of the disclosure, as embodied and broadly described herein, there is provided a display device comprising a display panel including a display area that displays an image and a bezel area around the display area, a gate driving circuit in the bezel area, the gate driving circuit driving a plurality of gate lines in the display area, an output line in the bezel area and extending from the gate driving circuit towards a gate line of the plurality of gate lines, a jumping part in the bezel area, the jumping part connecting the output line with the gate line, an output transistor in the gate driving circuit, the output transistor connected to the output line and outputting a gate signal to the gate line via the output line, an output capacitor in the gate driving circuit between the output transistor and the jumping part, the output capacitor including a first electrode connected to a gate electrode of the output transistor and a second electrode partially overlapping the first electrode and the second electrode connected to a drain electrode of the output transistor and the output line, the first electrode including an extension region that is non-overlapping with the second electrode and extends in a first direction towards the jumping part, and an insulating layer on the first electrode and the gate line, a first portion of the insulating layer between the first electrode and the second electrode.

In accordance with one or more other embodiments of the present disclosure, there is provided a display device comprising a display panel including a display area that displays an image and a bezel area around the display area, a gate driving circuit in the bezel area, the gate driving circuit including a plurality of stage circuits for driving a plurality of gate lines in the bezel area, an output line in the bezel area and extending from a stage circuit of the plurality of stage circuits towards a gate line of the plurality of gate lines, a jumping part in the bezel area, the jumping part connecting the output line with the gate line, an output transistor in the gate driving circuit, the output transistor connected to the output line and outputting a gate signal to the gate line via the output line, an output capacitor in the stage circuit between the output transistor and the jumping part the output capacitor including a first electrode connected to a gate electrode of the output transistor and a second electrode partially overlapping the first electrode and the second electrode connected to a drain electrode of the output transistor and the output line, the first electrode including an extension region that is non-overlapping with the second electrode and the extension region extends in a first direction towards the jumping part, an insulating layer on the first electrode and the gate line, a portion of the insulating layer between the first electrode and the second electrode, and a groove portion in the extension region of the first electrode, the groove portion including an opening in an area of the extension region that partially surrounds the output line, wherein the gate line includes a protruding pattern extending from an end portion of the gate line in a second direction that intersects the first direction.

In accordance with one or more other embodiments of the present disclosure, there is provided a display device comprising a display panel including a display area that displays an image and a bezel area around the display area, a gate driving circuit in the bezel area, the gate driving circuit driving a plurality of gate lines in the display area, an output transistor in the gate driving circuit, the output transistor outputting a gate signal to a gate line of the plurality of gate lines, and an output capacitor in the gate driving circuit, the output capacitor including a first electrode connected to a gate electrode of the output transistor and a second electrode connected to a drain electrode of the output transistor, wherein the first electrode includes an extension region that extends past an end of the second electrode in a first direction such that the extension region is non-overlapping with the second electrode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
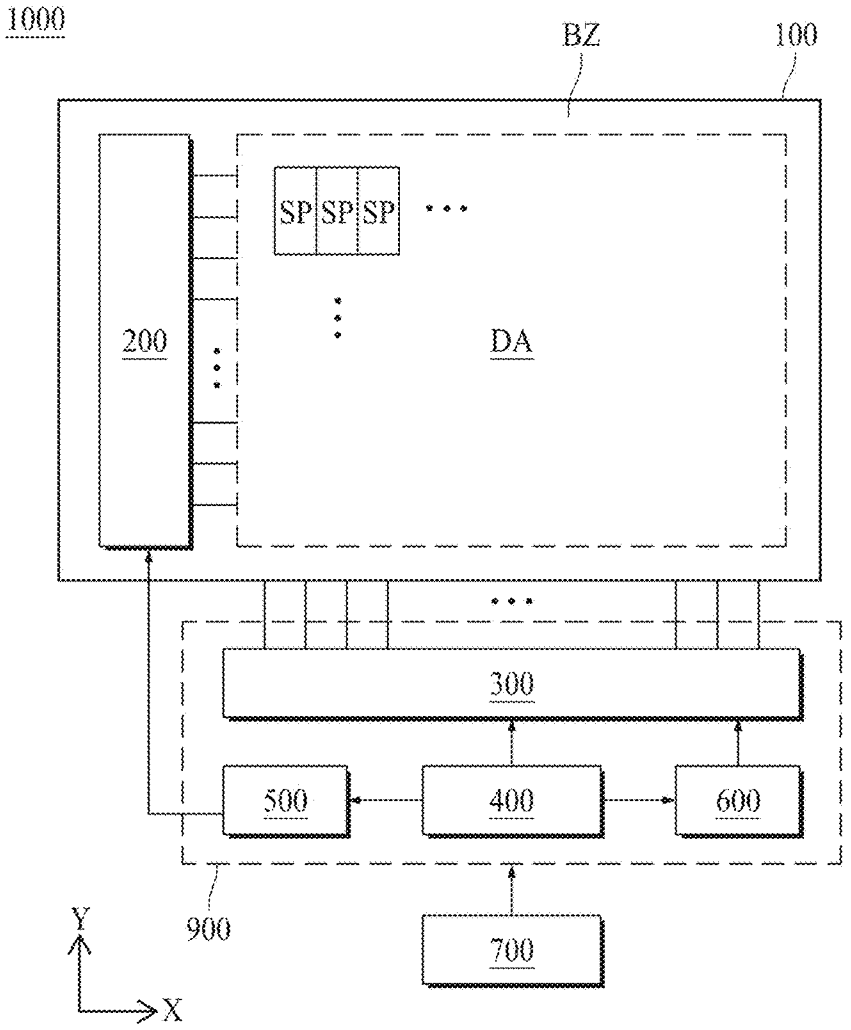
FIG. 1 is a block diagram illustrating a configuration of a display apparatus according to one or more embodiments of the present disclosure.

Advantages and features of the present disclosure, and implementation methods thereof will be clarified through the following embodiments, described with reference to the accompanying drawings. The present disclosure may, however, be embodied in different forms and should not be construed as being limited to the embodiments set forth herein. Rather, these embodiments are provided so that this disclosure will be thorough and complete, and will fully convey the scope of the present disclosure to those skilled in the art. Further, the present disclosure is only defined by the scope of the claims.

The shapes, sizes, ratios, angles, and numbers disclosed in the drawings for describing embodiments of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case in which "comprise," "have," and "include" described in the present specification are used, another part may also be present unless "only" is used. The terms in a singular form may include plural forms unless noted to the contrary.

In construing an element, the element is construed as including an error region although there is no explicit description thereof.

In describing a positional relationship, for example, when the positional order is described as "on," "above," "below," "beneath", and "next," the case of no contact therebetween may be included, unless "just" or "direct" is used.

If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically. The embodiments of the present disclosure may be carried out independently from each other, or may be carried out together in a co-dependent relationship.

In the drawings, the same or similar elements are denoted by the same reference numerals even though they are depicted in different drawings.

In the embodiments of the present disclosure, a source electrode and a drain electrode are distinguished from each other, for convenience of explanation. However, the source electrode and the drain electrode are used interchangeably. Thus, the source electrode may be the drain electrode, and the drain electrode may be the source electrode. Also, the source electrode in any one embodiment of the present disclosure may be the drain electrode in another embodiment of the present disclosure, and the drain electrode in any one embodiment of the present disclosure may be the source electrode in another embodiment of the present disclosure.

In one or more embodiments of the present disclosure, for convenience of explanation, a source region is distinguished from a source electrode, and a drain region is distinguished from a drain electrode. However, embodiments of the present disclosure are not limited to this structure. For example, a source region may be a source electrode, and a drain region may be a drain electrode. Also, a source region may be a drain electrode, and a drain region may be a source electrode.

Figure 2:
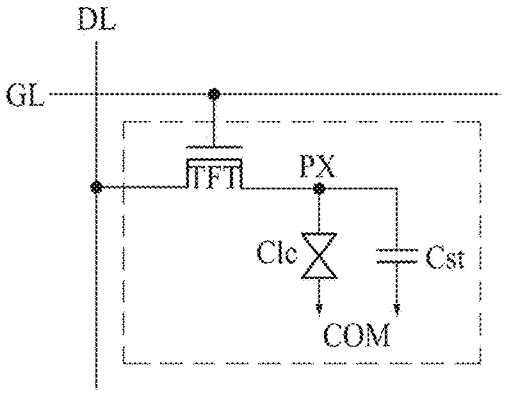
FIG. 2 is a diagram illustrating an example of a structure of a subpixel according to one or more embodiments of the present disclosure.

FIG. 1 is a block diagram illustrating a configuration of a display apparatus according to one or more embodiments of the present disclosure, and FIG. 2 is a diagram illustrating an example of a structure of a subpixel according to one or more embodiments of the present disclosure.

Referring to FIG. 1, the display device 1000 may include a display panel 100, a driving circuit 900, and a power management circuit 700. The driving circuit 900 may include a gate driving circuit 200, a data driving circuit 300, a timing controller 400, a level shifter 500 (e.g., level shifter circuit), and a gamma voltage generator circuit 600, and the gate driving circuit 200 may be embedded in the display panel 100.

The display device 1000 according to one or more embodiments of the present disclosure may be any one of various display devices including a liquid crystal display device, an electroluminescent display device, and a micro light emitting diode (LED) display device, etc. The electroluminescent display device may be an organic light emitting diode (OLED) display device, a quantum-dot light emitting diode display device, or an inorganic light emitting diode display device.

The display panel 100 according to one or more embodiments of the present disclosure may be a rigid display panel or a flexible display panel capable of shape deformation, such as a foldable, bendable, rollable, and stretchable display panel.

The display panel 100 according to one or more embodiments of the present disclosure may include a display area DA in which a plurality of subpixels SP are arranged in a matrix form, and a bezel area BZ disposed around the display area DA.

In an embodiment, the display panel 100 may further include a touch sensor disposed to overlap the display area DA to sense a user's touch.

The display area DA of the display panel 100 may include a plurality of pixels composed of three or four color subpixels SP that emit light of different colors to display an image. The sub-pixels SP may include a red sub-pixel that emits red light, a green sub-pixel that emits green light, and a blue sub-pixel that emits blue light, and may further include a white sub-pixel that emits white light.

In one or more embodiments, the display panel 100 may be a liquid crystal panel, and may include the sub-pixel configuration illustrated in FIG. 2. The display panel 100 may include first and second substrates bonded with a liquid crystal layer interposed therebetween, and polarizing plates respectively attached to outer surfaces of the first and second substrates. Signal lines and electrodes including a gate line GL connected to the thin film transistor TFT, a data line DL, and a pixel electrode PX, may be disposed on the first substrate. A common electrode COM may be disposed on any one of the first and second substrates. A black matrix and a color filter of the sub-pixels SP may be disposed on any one of the first and second substrates.

In one or more embodiments, the subpixel SP may be independently driven by a thin film transistor TFT connected to the gate line GL and the data line DL. Each subpixel SP may include a thin film transistor TFT connected to the gate line GL and the data line DL, a liquid crystal capacitor Clc connected in parallel with the thin film transistor TFT, and a storage capacitor Cst. The liquid crystal capacitor Clc may charge a difference voltage between the data signal supplied to the pixel electrode PX through the thin film transistor TFT and the common voltage supplied to the common electrode COM, and may control light transmittance by driving the liquid crystal according to the charged voltage. The storage capacitor Cst may serve to stably hold the voltage charged in the liquid crystal capacitor Clc while the thin film transistor TFT is turned off.

Each sub-pixel SP may adjust the light transmittance of the light transmitted through the display panel 100 and the polarizing plate from the backlight unit by driving the liquid crystal according to the charged voltage to change the liquid crystal arrangement direction. Each sub-pixel SP may express a gray scale of an image by multiplying the brightness of the backlight unit and the light transmittance controlled according to the data signal in each sub-pixel SP.

The liquid crystal layer of the liquid crystal capacitor Clc in each sub-pixel SP may be driven in twisted nematic (TN) mode or vertical alignment (VA) mode by a vertical electric field applied through the pixel electrode PX and the common electrode COM, may be driven in in-plane switching (IPS) mode by a horizontal electric field applied through the pixel electrode PX and the common electrode COM, or may be driven in Fringe Field Switching (FFS) mode by a fringe electric field applied through the pixel electrode PX and the common electrode COM.

In one or more embodiments, the pixel electrode PX and the common electrode COM of each subpixel SP may disposed on the first substrate with an insulation layer disposed therebetween, and one of the pixel electrode PX and the common electrode COM may include a plurality of slits overlapping another one of the pixel electrode PX and the common electrode COM, and the liquid crystal layer may be driven in FFS mode by applying a fringe electric field to the liquid crystal layer.

A plurality of transistors disposed in the display area DA of the display panel 100 and the bezel area BZ including the gate driving circuit 200 may include a-Si transistor using an amorphous silicon (a-Si) semiconductor, an LTPS transistor using a low temperature polysilicon (LTPS) semiconductor, or an oxide transistor using a metal-oxide semiconductor.

The gate driving circuit 200 may be disposed in any one of both bezel areas BZ facing each other with the display area DA interposed therebetween in the display panel 100, or may be disposed in both bezel areas BZ. The gate driving circuit 200 may be embedded in the bezel area BZ in a gate in panel (GIP) type including thin film transistors formed in the same process as the thin film transistor TFT of the display area DA.

The gate driving circuit 200 may operate by receiving a plurality of gate control signals supplied through the level shifter 500 from the timing controller 400. The gate driving circuit 200 may receive a plurality of gate control signals from the timing controller 400. The gate driving circuit 200 may be controlled by a plurality of gate control signals and may individually drive the gate lines GL of the display panel 100. The gate driving circuit 200 may output a gate signal or a scan signal of a gate-on voltage to the corresponding gate line GL during a driving period of each gate line GL, and may output a gate-off voltage to the corresponding gate line GL during a non-driving period of each gate line GL.

Each output line of the gate driving circuit 200 may be connected to each gate line GL through a jumping structure through contact holes of different metal layers. In order to reduce the bezel area BZ, the gate driving circuit 200 according to one or more embodiments of the present disclosure includes a short-circuit prevention pattern capable of preventing short-circuit defects due to static electricity even if a distance between the output capacitor connected to each output line and the jumping structure is reduced, thereby preventing display defects such as short-circuit defects due to static electricity generation. A detailed description thereof will be provided later.

The level shifter 500 may receive control signals from the timing controller 400 to generate a plurality of gate control signals by level shifting or logic processing them and output them to the gate driving circuit 200.

The gamma voltage generation circuit 600 may generate a plurality of reference gamma voltages having different voltage levels and output the generated gamma voltages to the data driving circuit 300. The gamma voltage generation circuit 600 may generate a plurality of reference gamma voltages corresponding to gamma characteristics of the display device under the control of the timing controller 400 and output the generated gamma voltages to the data driving circuit 300. The gamma voltage generation circuit 600 may be configured as a programmable gamma IC, and may generate or adjust the reference gamma voltages according to gamma data supplied from the timing controller 400 and output the generated gamma voltages to the data driving circuit 300.

The data driving circuit 300 may convert digital data received from the timing controller 400 together with data control signals into analog data signals to supply analog data signals to the data line DL of the display panel 100. The data driving circuit 300 may subdivide a plurality of reference gamma voltages supplied from the gamma voltage generation circuit 600 and convert digital data into analog data voltages by using the subdivided gamma voltages.

The data driving circuit 300 may include at least one data integrated circuit IC. The data IC may be embedded in the bezel area BZ of the display panel 100 or may be embedded in a circuit film to be connected to the display panel 100.

The timing controller 400 may receive a source image and timing control signals from an external host system. The host system may be any one of a system of a portable terminal such as a computer, a TV system, a set-top box, a tablet, or a mobile phone, etc. The timing control signals may include a dot clock, a data enable signal, a vertical synchronization signal, and a horizontal synchronization signal, etc.

The timing controller 400 may control the gate driving circuit 200 and the data driving circuit 300 using timing control signals supplied from the host system and timing setting information stored therein. The timing controller 400 may generate a plurality of gate control signals for controlling driving timing of the gate driving circuit 200 and output the generated gate control signals to the gate driving circuit 200. The timing controller 400 according to one or more embodiments of the present disclosure may generate control signals for timing control so that the level shifter 500 may generate a plurality of gate control signals and supply the same to the gate driving circuit 200 and output the generated control signals to the level shifter 500. The timing controller 400 may generate a plurality of data control signals for controlling driving timing of the data driving circuit 300 and output the generated data control signals to the data driving circuit 300.

The timing controller 400 may perform various image processing including luminance correction for power consumption reduction by using input image data, and may output the image-processed data to the data driving circuit 300. The timing controller 400 may align the image-processed data according to the subpixel arrangement of the display panel 100 and output the aligned data to the data driving circuit 300.

The power management circuit 700 may generate and supply a plurality of driving voltages required for driving the driving circuit 900 and the display panel 100. The power management circuit 700 may generate and supply a gate-on voltage and a gate-off voltage to the gate driving circuit 200 of the display panel 100, and may generate and supply a common voltage to the common electrode COM of the display panel 100. The power management circuit 700 may generate and supply a plurality of driving voltages required for operations of the data driving circuit 300, the timing controller 400, the level shifter 500, and the gamma voltage generator 600.

Figure 3:
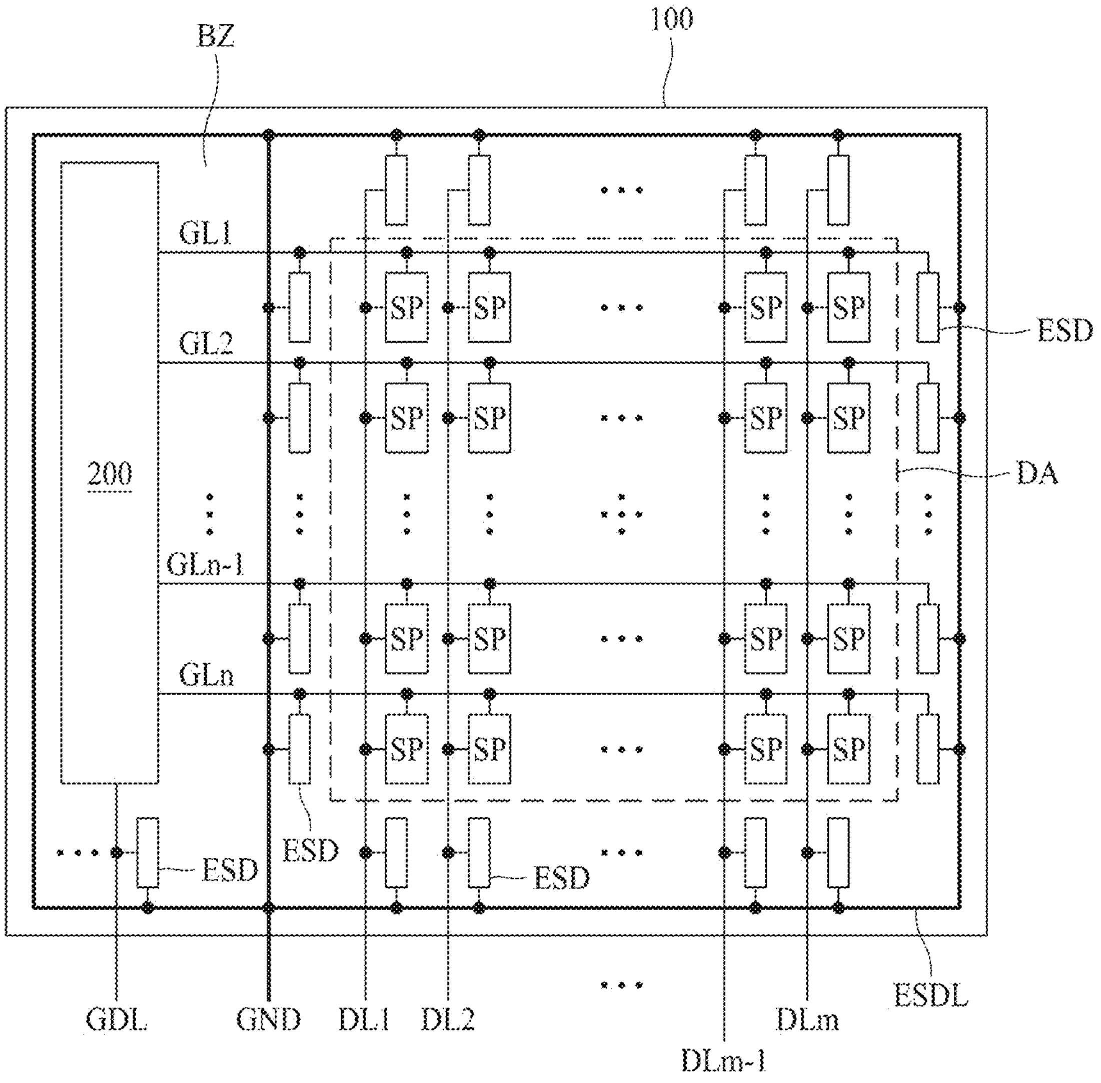
FIG. 3 is a diagram schematically illustrating an example of a configuration of a display panel according to one or more embodiments of the present disclosure.
Figure 4:
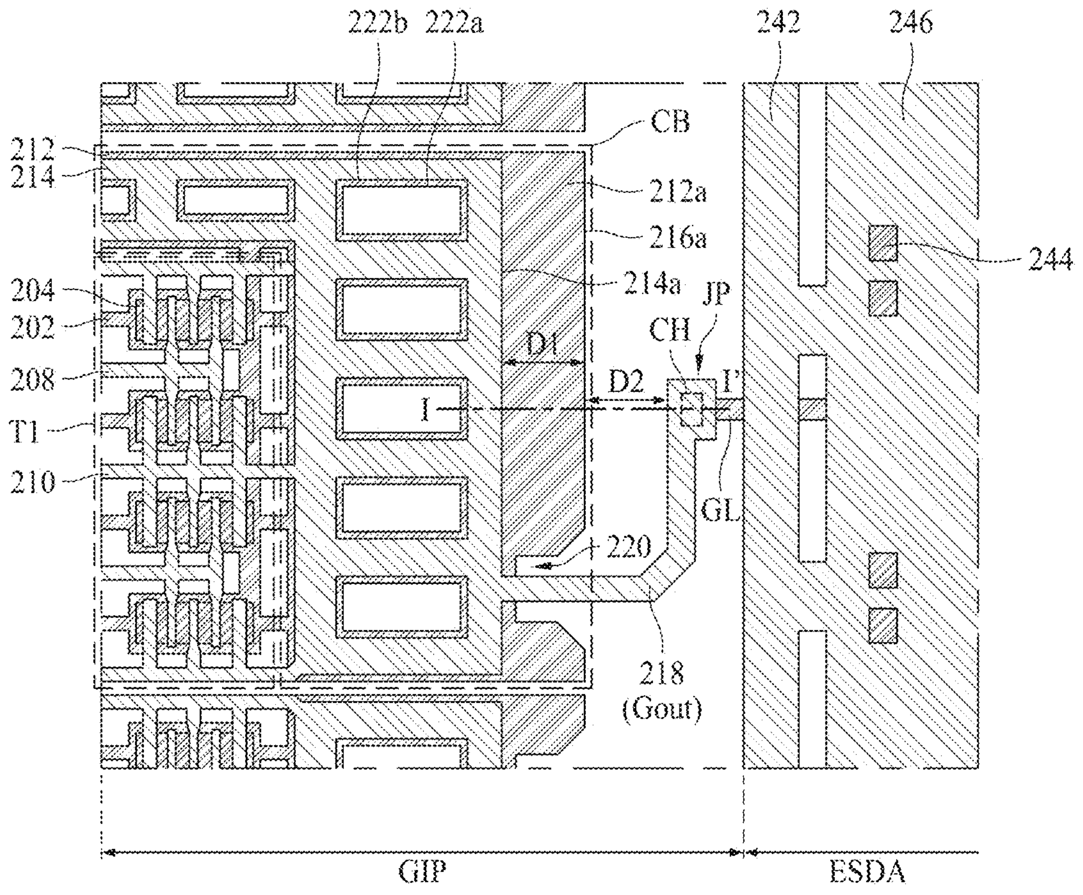
FIG. 4 is a plan view illustrating an example of a portion of a bezel area of a display panel according to one or more embodiments of the present disclosure.
Figure 5:
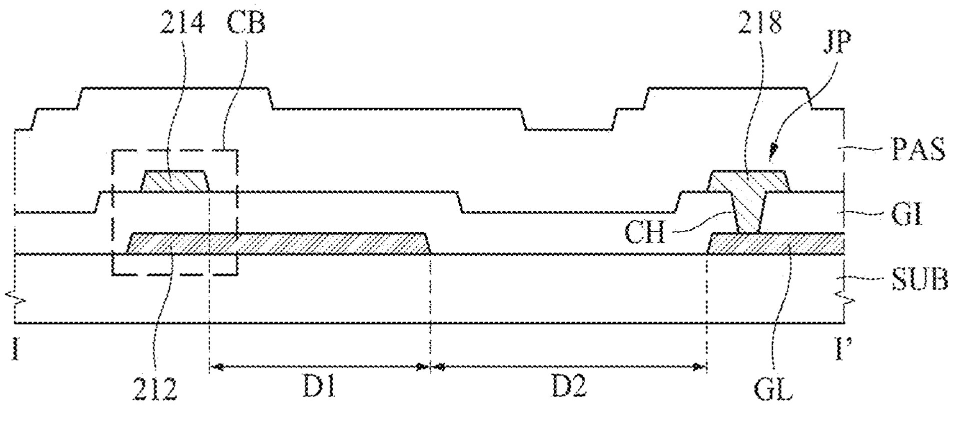
FIG. 5 is a cross-sectional view illustrating a cross section taken along line I-I' shown in FIG. 4 according to one or more embodiments of the present disclosure.
Figure 6:
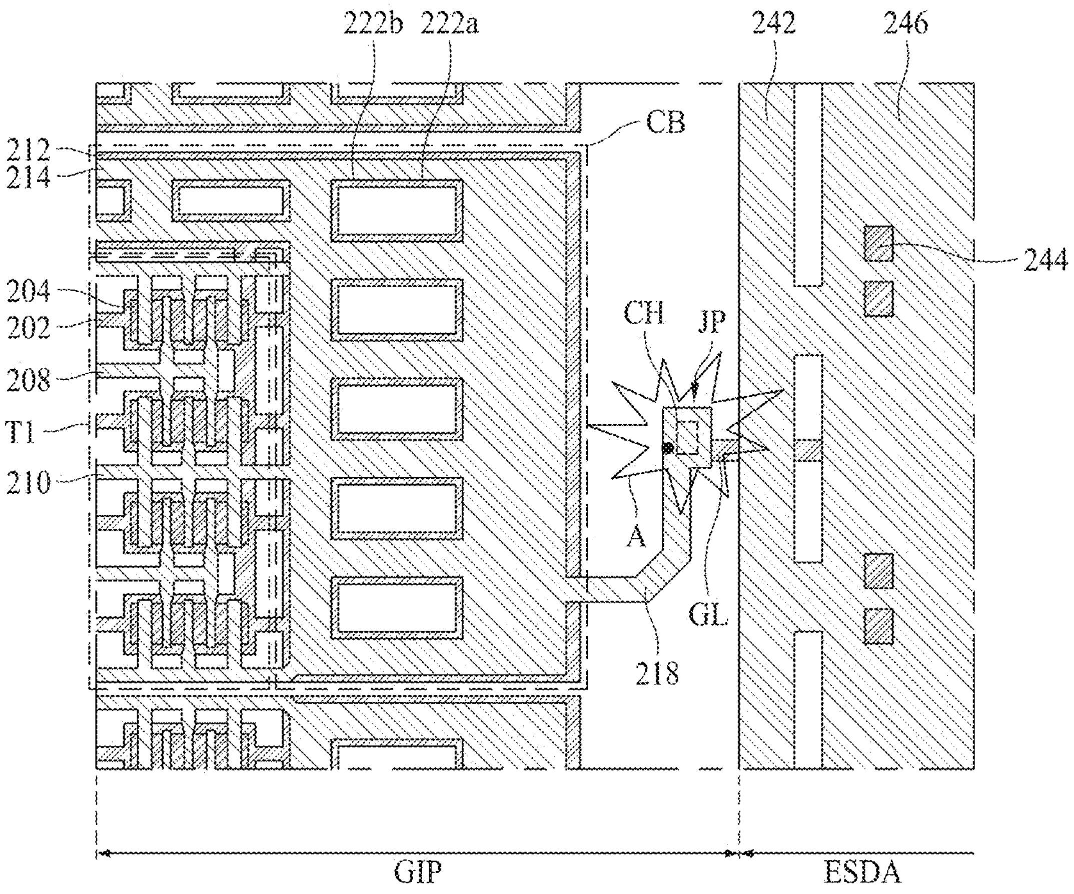
FIG. 6 is a plan view illustrating a portion of a bezel area of a display panel according to a comparative example.
Figure 7:
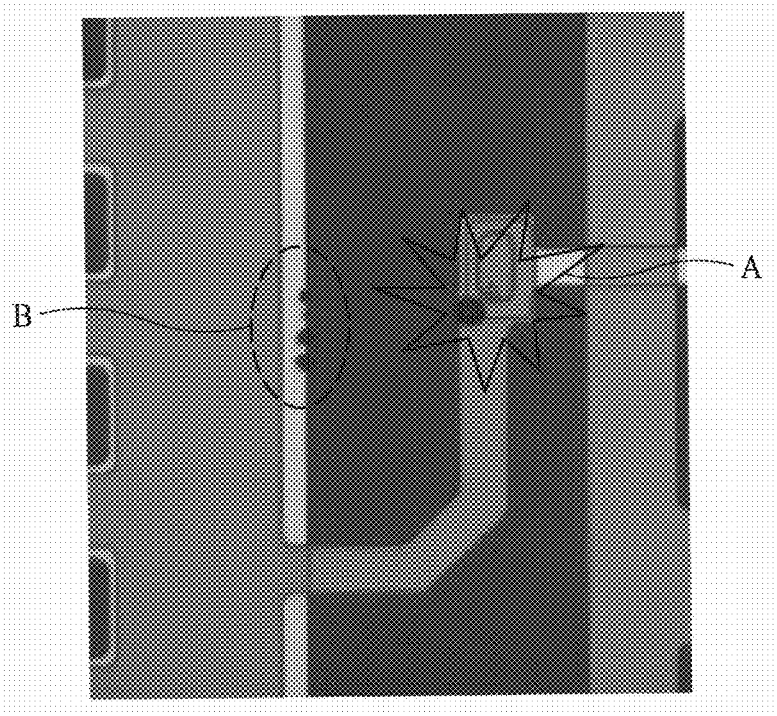
FIG. 7 is a diagram illustrating a defective part of the display panel shown in FIG. 6 due to static electricity.

FIG. 3 is a view schematically illustrating an example of a configuration of a display panel according to one or more embodiments of the present disclosure, FIG. 4 is a plan view illustrating an example of a portion of a bezel area of the display panel according to one or more embodiments of the present disclosure, and FIG. 5 is a cross-sectional view illustrating a cross section taken along a line I-I' shown in FIG. 4 according to one or more embodiments of the present disclosure. FIG. 6 is a plan view illustrating a portion of a bezel area of a display panel according to a comparative example, and FIG. 7 is a view illustrating a defective portion of the display panel shown in FIG. 6 due to static electricity.

Referring to FIG. 3, the display panel 100 according to one or more embodiments of the present disclosure may include a display area DA in which a plurality of subpixels SP are disposed, and a bezel area BZ in which the gate driving circuit 200 is disposed.

The display area DA may include a plurality of gate lines GL1 to GLn and a plurality of data lines DL1 to DLn connected to the plurality of subpixels SP.

The gate driving circuit 200 may include a plurality of stage circuits individually connected to the plurality of gate lines GL1 to GLn to sequentially output a plurality of scan signals or gate signals.

The display panel 100 may include a plurality of electrostatic discharge circuits ESD disposed in the bezel area BZ and individually connected to the plurality of gate lines GL1 to GLn, the plurality of data lines DL1 to DLm, and the plurality of signal supply lines GDL, and an electrostatic discharge line ESDL commonly connected to the plurality of electrostatic discharge circuits ESD. The electrostatic discharge line ESDL may be disposed in the form of a closed loop surrounding the bezel area BZ and may be connected to the ground line GND.

When static electricity flows through the corresponding signal lines, the plurality of electrostatic discharge circuits ESD are turned on to discharge static electricity through the electrostatic discharge line ESDL and the ground line GND, thereby preventing static electricity from flowing into the display area DA.

Referring to FIGS. 3 and 4, the bezel area BZ of the display panel 100 according to one or more embodiments of the present disclosure may include a gate driving circuit area GIP in which a gate driving circuit 200 is disposed, and an electrostatic discharge circuit area ESDA in which an electrostatic discharge circuit ESD connected to the gate line GL is disposed. The electrostatic discharge circuit area ESDA may be disposed between the gate driving circuit area GIP and the display area DA.

Each stage circuit connected to each gate line GL in the gate driving circuit 200 may include an output buffer circuit that outputs a scan signal or a gate signal in response to a control signal of the Q node. In order to stably output the scan signal or the gate signal, the output buffer circuit may include an output transistor T1, which is a pull-up transistor having a maximum size among a plurality of thin film transistors constituting each stage circuit, and an output capacitor CB occupying a maximum area in each stage circuit.

The output transistor T1 may include a gate electrode 202 to which the control signal of the Q node is supplied, a semiconductor layer 204 overlapping the gate electrode 202 with the gate insulating layer interposed therebetween, a source electrode 208 and a drain electrode 210 overlapped with the source region and the drain region of the semiconductor layer 204, respectively.

The gate electrode 202 of the output transistor T1 may include a plurality of gate electrode patterns connected in parallel. The semiconductor layer 204 may include a plurality of semiconductor patterns overlapping on a plurality of gate electrode patterns of the gate electrode 202, respectively. The source electrode 208 may include a plurality of source electrode patterns overlapping a plurality of source regions provided in each of a plurality of semiconductor patterns of the semiconductor layer 204 and connected in parallel to each other. The drain electrode 210 may include a plurality of drain electrode patterns overlapping a plurality of drain regions facing with a source region and a channel region interposed therebetween in each of a plurality of semiconductor patterns of the semiconductor layer 204, and connected in parallel to each other.

The output capacitor CB may include a first electrode 212 connected to the gate electrode 202 of the output transistor T1, and a second electrode 214 overlapping the first electrode 212 with the gate insulating layer GI interposed therebetween and connected to the drain electrode 210 of the output transistor T1. The gate insulating layer GI may be disposed on the first electrode 212 and the gate line GL, wherein a portion of the gate insulating layer GI may be between the first electrode 212 and the second electrode 214. In one or more embodiments, at least one of insulating layer may be disposed on the first electrode 212 and the gate line GL, wherein a portion of at least one of insulating layer may be between the first electrode 212 and the second electrode 214.

The first electrode 212 of the output capacitor CB may be formed of a gate metal layer having the same layer as the gate electrode 202 of the output transistor T1, and the second electrode 214 may be formed of a source/drain metal layer having the same layer as the source/drain electrodes 208 and 210.

In the output capacitor CB, the first and second electrodes 212 and 214 may include a plurality of openings 222*a* and 222*b* for parasitic capacitance reduction. The size of the opening 222*b* of the second electrode 214 may be smaller than the size of the opening 222*a* of the first electrode 212.

In the output capacitor CB, the first electrode 212 may have an area larger than that of the second electrode 214. The output capacitor CB may have an overlapping area of the first electrode 212 and the second electrode 214 and a non-overlapping area of the first electrode 212 and the second electrode 214 provided so that the edge portion of the first electrode 212 extends more than the edge portion of the second electrode 214.

The output capacitor CB may be disposed in a first region adjacent to the output transistor T1 in the first direction X and a second region adjacent to the output transistor T1 in the second direction Y. For example, the output capacitor CB may be disposed in a right region adjacent to the output transistor T1 in the first direction X and an upper region adjacent to the output transistor T1 in the second direction Y.

Each stage circuit of the gate driving circuit 200 may output a scan signal Gout through the second electrode 214 of the output capacitor CB and the output line 218 connected to the drain electrode 210 of the output transistor T1. The output capacitor CB may be a bootstrap capacitor. When the output transistor T1 outputs the scan signal Gout through the second electrode 214 of the output capacitor CB and the output line 218, a voltage level of the gate electrode of the output transistor T1 connected to the first electrode 212 of the output capacitor CB may bootstrap according to the scan signal, so that the output capacitor CB may reduce a rising time of the scan signal Gout. Therefore, the output transistor T1 may rapidly output the stable scan signal Gout. The output line 218 of each stage circuit may be formed of a source/drain metal layer that has the same layer as the source and drain electrodes 208 and 210 of the output transistor T1, and may be integrally formed with the drain electrode 210. Thus, the output transistor T1 may output the scan signal Gout to the output line 218 for driving the gate line GL, i.e., the output transistor T1 may output the scan signal Gout to the gate line GL via the output line 218.

The output line 218 may extend in the bezel area BZ from the gate driving circuit towards the gate line GL and the electrostatic discharge circuit area ESDA. The output line 218 of each stage circuit of the gate driving circuit 200 may be connected to the gate line GL through a jumping part JP disposed between the output capacitor CB and the electrostatic discharge circuit ESD. The electrostatic discharge circuit ESD may include a discharge transistor including a gate electrode, a semiconductor layer 244, and a source/drain electrode 246 disposed in the electrostatic discharge circuit area ESDA, and an electrostatic discharge line 242 connected to the discharge transistor.

The output line 218 of the gate driving circuit 200 may include a horizontal part, for example a first portion, extending in parallel to the horizontal direction X from the second electrode 214 of the output capacitor CB, a vertical part, for example a second portion, extending in parallel to the vertical direction Y orthogonal to the horizontal direction X, and an inclined part, for example a third portion, connecting the horizontal part and the vertical part. The third portion of the output line 218 may extend in a third direction that is different from the horizontal direction X and the vertical direction Y. Some of the horizontal part and the inclined part and the vertical part of the output line 218 may be disposed in a region between the output capacitor CB and the electrostatic discharge circuit ESD. The vertical part of the output line 218 may extend in the vertical direction Y parallel to the edge portion 216*a* of the first electrode 212 of the output capacitor CB.

The vertical part of the output line 218 may be connected to the gate line GL through the jumping part JP at the end portion of the output line 218. The jumping part JP may be disposed on the substrate SUB and may include an end portion of a gate line GL formed of a gate metal layer, and the vertical end portion of the output line 218, which is disposed to overlap the horizontal end portion of the gate line GL on the gate insulating layer GI covering the gate line GL, and is made of a source/drain metal layer, and a passivation layer PAS may be disposed on the output line 218. The vertical end portion of the output line 218 in the jumping part JP may be connected to the horizontal end portion of the gate line GL through a contact hole CH penetrating the gate insulating layer GI. The vertical end portion of the output line 218 disposed at the jumping part JP may have a line width wider than that of other portions of the output line 218, and a horizontal end portion of the gate line GL may also have a line width wider than that of other portions of the gate line GL.

In an area adjacent to the electrostatic discharge circuit ESD in the horizontal direction X, the output capacitor CB may have an extension region 212*a* of the first electrode 212 that does not overlap the second electrode 214 by extending the first length D1 toward the electrostatic discharge circuit ESD more than the second electrode 214. The extension region 212*a* of the first electrode 212 may extend in the horizontal direction X towards the jumping part JP.

The extension region 212*a* of the first electrode 212 may be expressed as the first short-circuit prevention pattern 212*a*, the extension region of the first electrode 212, the protrusion area, or a non-overlapping area with the second electrode 214 of the first electrode 212.

Since the edge portion 216*a* of the first electrode 212 and the edge portion 214*a* of the second electrode 214 are spaced apart by the first length D1 without overlapping by the extension region 212*a* of the first electrode 212, even if the gate insulating layer GI is damaged by static electricity, short-circuit defects of the first and second electrodes 212 and 214 may be prevented from occurring.

Referring to FIGS. 6 and 7, in the bezel region of the display panel according to the comparative example, static electricity may be generated in the jumping part JP of the output line 218 and the gate line GL adjacent to the output capacitor CB. In this case, static electricity may be introduced into the overlapping edge portion of the first and second electrodes 212 and 214 of the output capacitor CB adjacent to the static electricity generating area A of the jumping part JP, and thus the gate insulating layer may be lost, the overlapping edge portions of the first and second electrodes 212 and 214 may be short-circuited, and a display defect B may occur.

On the other hand, the display panel 100 according to one or more embodiments of the present disclosure may include, as shown in FIGS. 4 and 5, the extension region 212*a* of the first electrode 212 in which the output capacitor CB does not overlap the second electrode 214 may have a first length D1 in the horizontal direction X. In one or more embodiments, the first length D1 in the horizontal direction X of the extension region 212*a* of the first electrode 212, that is the distance in the horizontal direction X between the edge portion 214*a* of the second electrode 214 and the edge portion 216*a* of the first electrode 212 may be set to be 30 μm or more.

Accordingly, even if static electricity occurs in the jumping part JP of the output line 218 and the gate line GL adjacent to the output capacitor CB and the damage to the gate insulating layer GI occurs, the short-circuit defects of the first and second electrodes 212, and 214, that is, short-circuit defects in the gate metal layer and the source/drain metal layer may be prevented from occurring, thereby preventing a defect due to static electricity from occurring.

The extension region 212*a* of the first electrode 212 may have the same length as the length in the vertical direction Y of each stage circuit in the vertical direction Y.

With respect to the horizontal direction (X), the second length D2 between the extension region 212*a* of the first electrode 212 and the jumping part JP may be set to be similar to or greater than the first length D1 of the extension region 212*a* of the first electrode 212. In one or more embodiments, the second length D2 between the extension region 212*a* of the first electrode 212 and the jumping part JP may be set to be 35 μm or more. Accordingly, the influence of the static electricity flowing from the jumping part JP of the output line 218 and the gate line GL toward the output capacitor CB may be reduced.

Furthermore, in the output capacitor CB according to one or more embodiments of the present disclosure, the extension region 212*a* of the first electrode 212 further includes a groove portion 220 disposed in the region of the output line 218, thereby minimizing or at least reducing an overlapping area between the extension region 212*a* of the first electrode 212 and the output line 218. The groove portion 220 includes an opening in an area of the extension region 212*a* that surrounds the output line 218. Accordingly, the display device according to one or more embodiments of the present disclosure may prevent short-circuit defects between the first electrode 212 and the output line 218, that is, short-circuit defects between the gate metal layer and the source/drain metal layer, even if static electricity occurs in the jumping part JP of the output line 218 and the output line 218 adjacent to the jumping part JP.

The groove portion 220 of the extension region 212*a* of the first electrode 212 disposed at the horizontal portion of the output line 218 has a shape in which the opening of the groove portion increases from the edge portion 214*a* of the second electrode 214 to the electrostatic discharge circuit ESD, that is, a vertical separation distance between the extension region 212*a* of the first electrode 212 and the output line 218 increases, thereby further preventing short-circuit defects between the first electrode 212 and the output line 218 due to static electricity. The extension region 212*a* of the first electrode 212 may include a first portion of a first width (e.g., equal to the first length D1) and a second portion of a second width that is less than the first width. The output line 218 may overlap the second portion of the extension region 212*a* without overlapping the first portion of the extension region 212*a* in a plan view of the display device.

The groove portion 220 of the extension region 212*a* of the first electrode 212 may be expressed as a second short-circuit prevention pattern.

Figure 8:
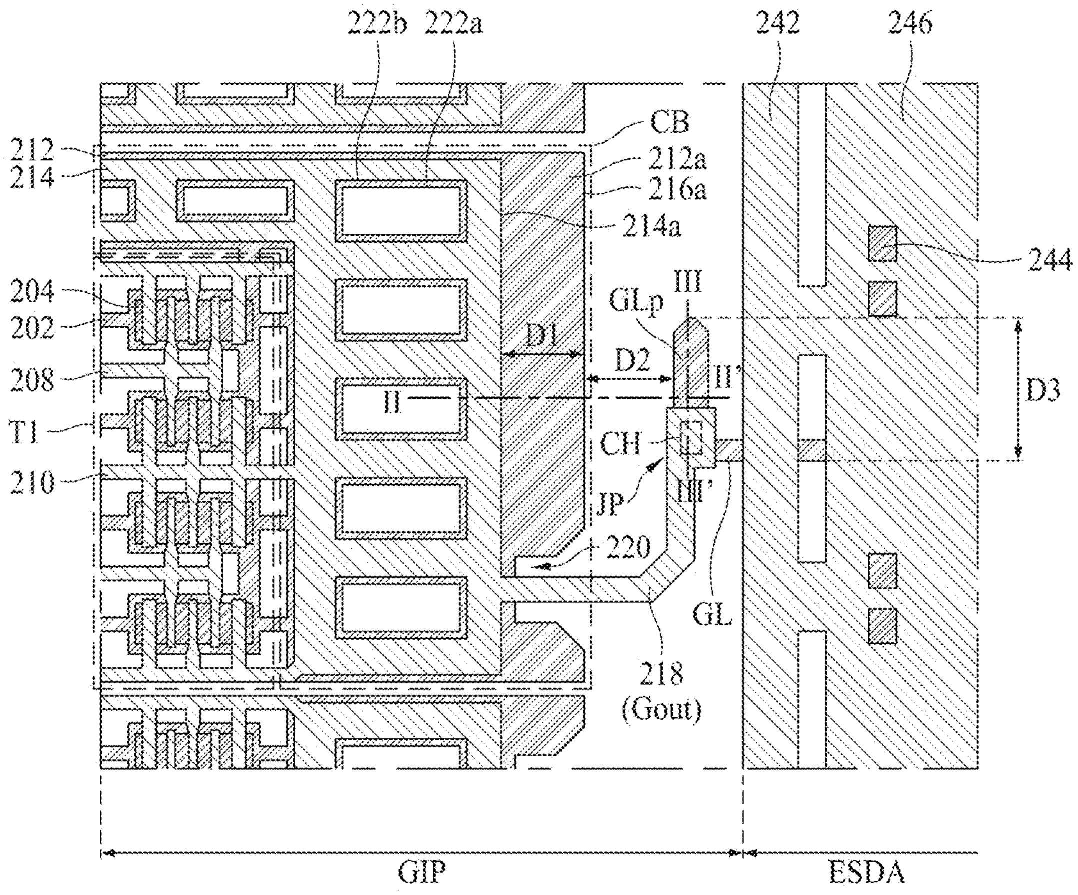
FIG. 8 is a plan view illustrating an example of a portion of a bezel area of a display panel according to one or more embodiments of the present disclosure.
Figure 9A:
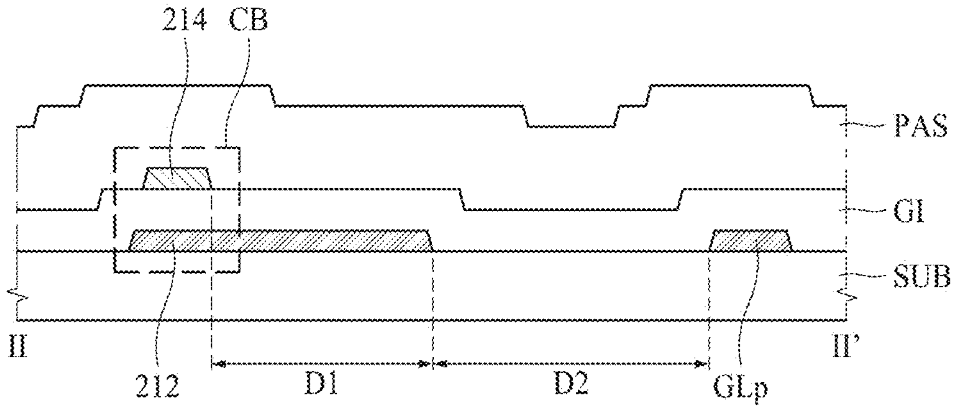
FIG. 9A is a cross-sectional view illustrating a cross section taken along line II-II' shown in FIG. 8 according to one or more embodiments of the present disclosure.
Figure 9B:
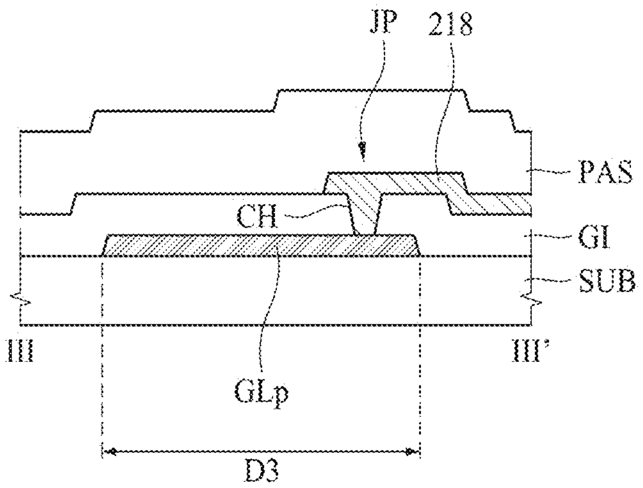
FIG. 9B is a cross-sectional view illustrating a cross section taken along line III-III' shown in FIG. 8 according to one or more embodiments of the present disclosure.

FIG. 8 is a plan view illustrating an example of a portion of a bezel area of a display panel according to one or more embodiments of the present disclosure, FIG. 9A is a cross-sectional view illustrating a cross section taken along line II-II' of FIG. 8 according to one or more embodiments of the present disclosure, and FIG. 9B is a cross-sectional view illustrating a cross section taken along line III-III' of FIG. 8 according to one or more embodiments of the present disclosure.

The bezel area of the display panel according to the embodiment illustrated in FIG. 8 differs from the bezel area of the display panel according to the embodiment illustrated in FIG. 4 in that the jumping part JP of the output line 218 and the gate line GL additionally include the protruding pattern GLp of the gate line GL.

Referring to FIGS. 8 to 9B, in the gate driving circuit 200 according to one or more embodiments of the present disclosure, since the output capacitor CB has the extension regions 212*a* (the first short-circuit prevention pattern) of the first electrode 212 as described above with reference to FIGS. 4 and 5, the edge portion 216*a* of the first electrode 212 and the edge portion 214*a* of the second electrode 214 are spaced apart by the first length D1, thereby preventing the occurrence of short circuit defects in the first and second electrodes 212 and 214 due to static electricity.

As described above with reference to FIGS. 4 and 5, in the gate driving circuit 200 according to one or more embodiments of the present disclosure, the extension region 212*a* of the first electrode 212 further includes a groove portion 220 (second short prevention pattern) in which the extension region 212*a* of the first electrode 212 is placed in the area of the output line 218 in the output capacitor CB, thereby preventing short-circuit defects between the first electrode 212 and the output line 218 due to static electricity.

Furthermore, the gate driving circuit 200 of the display panel according to one or more embodiments of the present disclosure may further include a protruding pattern GLp that protrudes from the horizontal end portion of the gate line GL by a third length D3 in the vertical direction Y at the jumping part JP of the output line 218 and the gate line GL to prevent static electricity from occurring in the jumping part JP. A first end portion of the output line 218 may be connected to the second electrode 214, and a second end portion of the output line 218 may be connected to the gate line GL through the jumping part JP. The protruding pattern GLp of the gate line GL may extend from the horizontal end portion of the gate line GL at the jumping part JP in a first direction (e.g., vertical direction Y) that intersects a second direction (e.g., horizontal direction X). The end portion of the gate line GL may overlap the second end portion of the output line 218.

The protruding pattern GLp of the gate line GL may extend and protrude parallel to the extension region 212*a* of the first electrode 212 of the output capacitor CB in the vertical direction Y from the horizontal end portion of the gate line GL in the jumping part JP, and may non-overlap the output line 218. The protruding pattern GLp of the gate line GL may be expressed as an electrostatic induction pattern. A length in the vertical direction of the portion where the protruding pattern GLp of the gate line GL does not overlap the end of the output line 218 may be set to be greater than the length of the jumping part JP in the vertical direction. In one or more embodiments, the protruding pattern GLp of the gate line GL may have a length D3 of 60 μm in the vertical direction Y.

Accordingly, the protruding pattern GLp of the gate line GL induces static electricity to occur before the jumping part JP to prevent static electricity from occurring in the jumping part JP of the output line 218 and the gate line GL, thereby preventing short-circuit defects in the first and second electrodes 212 and 214 due to static electricity.

Accordingly, the present disclosure may have the following advantages.

According to one or more embodiments of the present disclosure, the display device may prevent short-circuit defects in the first electrode (gate metal layer) and the second electrode (source/drain metal layer) due to static electricity by including the extension region (first short-circuit prevention pattern) of the first electrode in which the output capacitor of the gate driving circuit does not overlap the second electrode.

According to one or more embodiments of the present disclosure, the display device may prevent short-circuit defects in the first electrode (gate metal layer) and the output line (source/drain metal layer) due to static electricity by further including a groove portion (second short-circuit prevention pattern) in which the extension region of the first electrode is disposed in the region of the output line in the output capacitor of the gate driving circuit.

Furthermore, according to one or more embodiments of the present disclosure, the display device has a protruding pattern that protrudes parallel to the extension region (short-circuit prevention pattern) of the first electrode of the output capacitor from the horizontal end portion of the gate line at the jumping part of the output line and the gate line to prevent static electricity from occurring in the jumping part thereby preventing the occurrence of short-circuit defects in the first electrode (gate metal layer) and the second electrode (source/drain metal layer) due to static electricity.

Furthermore, according to one or more embodiments of the present disclosure, the display device may improve product yield and achieve a low power consumption effect by preventing defects caused by static electricity.

The display device according to one or more embodiments of the present disclosure may be applied to various electronic devices. For example, the display device according to one or more embodiments of the present disclosure may be applied to a mobile device, a video phone, a smart watch, a watch phone, a wearable device, a foldable device, a rollable device, a bendable device, a flexible device, a curved device, an electronic diary, electronic book, a portable multimedia player (PMP), a personal digital assistant (PDA), MP3 player, a mobile medical device, a desktop PC, a laptop PC, a netbook computer, a workstation, a navigator, a vehicle navigator, a vehicle display device, a television, a wall paper display device, a signage device, a game device, a notebook computer, a monitor, a camera, a camcorder, and home appliances.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A display device, comprising:

a display panel including a display area that displays an image and a bezel area around the display area;

a gate driving circuit located in the bezel area, wherein the gate driving circuit drives a plurality of gate lines located in the display area;

an output line located in the bezel area and extended from the gate driving circuit towards a gate line of the plurality of gate lines;

a jumping part located in the bezel area, wherein the jumping part connects the output line to the gate line;

an output transistor located in the gate driving circuit, wherein the output transistor is connected to the output line and outputs a gate signal to the gate line via the output line;

an output capacitor located in the gate driving circuit and is located between the output transistor and the jumping part, wherein the output capacitor includes a first electrode connected to a gate electrode of the output transistor and a second electrode partially overlapping the first electrode, the second electrode is connected to a drain electrode of the output transistor and the output line, the first electrode includes an extension region that is non-overlapping with the second electrode and extends in a first direction towards the jumping part; and an insulating layer located on the first electrode and the gate line, wherein a first portion of the insulating layer is located between the first electrode and the second electrode.

2. The display device according to claim 1, wherein the extension region of the first electrode has a first length along the first direction and a second length along a second direction that is orthogonal to the first direction, wherein the second length is equal to a length in the second direction of a stage circuit of a plurality of stage circuits of the gate driving circuit, and wherein the stage circuit provides a driving signal to the gate line.

3. The display device according to claim 2, wherein the first length is a distance along the first direction located between an edge portion of the second electrode and an edge portion of the first electrode.

4. The display device according to claim 1, wherein the extension region of the first electrode includes a groove portion with an opening in an area of the extension region that partially surrounds the output line.

5. The display device according to claim 1, wherein the output line includes:

a first portion extending from the second electrode of the output capacitor in the first direction;

a second portion extending in a second direction that is orthogonal to the first direction; and a third portion connecting the first portion with the second portion, the third portion extending in a third direction that is different from the first direction and the second direction.

6. The display device according to claim 5, wherein the extension region of the first electrode includes a groove portion with an opening in an area of the extension region that surrounds the first portion of the output line and is adjacent to an edge portion of the second electrode, wherein a size of the opening increases as a distance from the edge portion of the second electrode increases.

7. The display device according to claim 1, wherein the jumping part includes:

an end portion of the gate line; and an end portion of the output line overlapping the end portion of the gate line with a second portion of the insulating layer located between the end portion of the gate line and the end portion of the output line, wherein the end portion of the output line is connected to the end portion of the gate line through a contact hole in the insulating layer, and the end portion of the output line extends from the second electrode of the output capacitor.

8. The display device according to claim 7, wherein the gate line includes a protruding pattern extending from the end portion of the gate line in a second direction that intersects the first direction.

9. The display device according to claim 8, wherein a first length of a first portion of the protruding pattern that is non-overlapping with the output line in the second direction is greater than a second length of a second portion of the protruding pattern that overlaps the output line in the second direction.

10. The display device according to claim 8, further comprising:

an electrostatic discharge circuit area located in the bezel area and is located between the gate driving circuit and the display area, and wherein the electrostatic discharge circuit area includes a plurality of electrostatic discharge circuits connected to the plurality of gate lines.

11. The display device according to claim 10, wherein the jumping part and the protruding pattern are located between the output capacitor and the electrostatic discharge circuit area in a plan view of the display device.

12. A display device, comprising:

a display panel including a display area that displays an image and a bezel area located around the display area;

a gate driving circuit located in the bezel area, wherein the gate driving circuit includes a plurality of stage circuits for driving a plurality of gate lines in the bezel area;

an output line located in the bezel area and extended from a stage circuit of the plurality of stage circuits towards a gate line of the plurality of gate lines;

a jumping part located in the bezel area, wherein the jumping part connects the output line to the gate line;

an output transistor located in the gate driving circuit, wherein the output transistor is connected to the output line and outputs a gate signal to the gate line via the output line;

an output capacitor located in the stage circuit and is located between the output transistor and the jumping part, wherein the output capacitor includes a first electrode connected to a gate electrode of the output transistor, a second electrode partially overlaps the first electrode and the second electrode is connected to a drain electrode of the output transistor and the output line, the first electrode includes an extension region that is non-overlapping with the second electrode and the extension region extends in a first direction towards the jumping part;

an insulating layer located on the first electrode and the gate line, wherein a portion of the insulating layer is located between the first electrode and the second electrode; and a groove portion located in the extension region of the first electrode, wherein the groove portion includes an opening in an area of the extension region that partially surrounds the output line, wherein the gate line includes a protruding pattern extending from an end portion of the gate line along a second direction that intersects the first direction.

13. The display device according to claim 12, further comprising:

an electrostatic discharge circuit area located in the bezel area and is located between the gate driving circuit and the display area in a plan view of the display device, and wherein the electrostatic discharge circuit area includes a plurality of electrostatic discharge circuits connected to the plurality of gate lines.

14. The display device according to claim 13, wherein the jumping part and the protruding pattern are located between the output capacitor and the electrostatic discharge circuit area in the plan view.

15. The display device according to claim 12, wherein the extension region of the first electrode has a first length along the first direction and a second length along the second direction, and wherein the second length is a-same as a length of the stage circuit in the second direction.

16. The display device according to claim 15, wherein the first length is a distance along the first direction located between an edge portion of the second electrode and an edge portion of the first electrode.

17. The display device according to claim 12, wherein the output line includes:

a first portion extending from the second electrode of the output capacitor along the first direction;

a second portion extending along the second direction; and a third portion connecting the first portion to the second portion, the third portion extending along a third direction that is different from the first direction and the second direction, wherein the groove portion is in an area of the extension region that surrounds the first portion of the output line.

18. A display device, comprising:

a display panel including a display area that displays an image and a bezel area around the display area;

a gate driving circuit located in the bezel area, wherein the gate driving circuit drives a plurality of gate lines in the display area;

an electrostatic discharge circuit area located in the bezel area and is located between the gate driving circuit and the display area, wherein the electrostatic discharge circuit area includes a plurality of electrostatic discharge circuits connected to the plurality of gate lines for discharging the display area;

an output transistor located in the gate driving circuit, wherein the output transistor outputs a gate signal to a gate line of the plurality of gate lines;

an output capacitor located in the gate driving circuit, wherein the output capacitor includes a first electrode connected to a gate electrode of the output transistor and a second electrode connected to a drain electrode of the output transistor;

a jumping part located in the bezel area; and an output line located in the bezel area and extended towards the electrostatic discharge circuit area, wherein a first end portion of the output line is connected to the second electrode of the output transistor, and a second end portion of the output line is connected to the gate line through the jumping part, wherein the first electrode includes an extension region that extends past an end of the second electrode along a first direction such that the extension region is non-overlapping with the second electrode, wherein the extension region includes a first portion having a first width and a second portion having a second width that is less than the first width, and wherein the output line overlaps the second portion of the extension region without overlapping the first portion of the extension region in a plan view of the display device.

19. The display device according to claim 18, wherein the gate line includes a protruding pattern that extends from an end portion of the gate line at the jumping part along a second direction that intersects the first direction, and wherein the end portion of the gate line overlaps the second end portion of the output line.

* * * * *